United States Patent
DeLuca et al.

(10) Patent No.: US 10,296,659 B2
(45) Date of Patent: May 21, 2019

(54) SEARCH QUERY INTENT

(71) Applicant: INTERNATIONAL BUSINESS MACHINES CORPORATION, Armonk, NY (US)

(72) Inventors: Lisa Seacat DeLuca, Baltimore, MD (US); Stefan A. Gert van der stockt, Johannesburg (ZA)

(73) Assignee: International Business Machines Corporation, Armonk, NY (US)

( * ) Notice: Subject to any disclaimer, the term of this patent is extended or adjusted under 35 U.S.C. 154(b) by 6 days.

(21) Appl. No.: 15/275,574

(22) Filed: Sep. 26, 2016

(65) Prior Publication Data

US 2018/0089332 A1     Mar. 29, 2018

(51) Int. Cl.
*G06F 17/30*     (2006.01)
*G06F 17/27*     (2006.01)

(52) U.S. Cl.
CPC ...... *G06F 17/30973* (2013.01); *G06F 17/276* (2013.01); *G06F 17/3064* (2013.01); *G06F 17/30867* (2013.01); *G06F 17/30976* (2013.01); *G06F 17/30991* (2013.01); *G06F 17/30684* (2013.01)

(58) Field of Classification Search
CPC ................................................ G06F 17/30973
See application file for complete search history.

(56) References Cited

U.S. PATENT DOCUMENTS

| | | | | |
|---|---|---|---|---|
| 7,321,892 B2 * | 1/2008 | Vadon | ................... | G06F 17/273 707/765 |
| 8,082,264 B2 * | 12/2011 | Bierner | ............... | G06F 17/3064 707/767 |
| 8,407,229 B2 | 3/2013 | Yang et al. | | |
| 8,924,410 B2 | 12/2014 | Bierner | | |
| 9,043,350 B2 * | 5/2015 | Tomko | .............. | G06F 17/30864 706/12 |
| 9,336,211 B1 * | 5/2016 | Bousquet | .......... | G06F 17/30038 |
| 2005/0289140 A1 * | 12/2005 | Ford | ................. | G06F 17/30705 |
| 2006/0117003 A1 * | 6/2006 | Ortega | ................ | G06F 17/2725 |
| 2006/0136403 A1 * | 6/2006 | Koo | .................... | G06F 17/30699 |
| 2008/0016101 A1 * | 1/2008 | Ginsburg | .......... | G06F 17/30864 |
| 2008/0071742 A1 * | 3/2008 | Yang | ................. | G06F 17/30864 |
| 2008/0120276 A1 * | 5/2008 | Chennavasin | .... | G06F 17/30672 |
| 2009/0006343 A1 * | 1/2009 | Platt | .................. | G06F 17/30389 |
| 2009/0077047 A1 * | 3/2009 | Cooper | .............. | G06F 17/2785 |
| 2009/0089044 A1 * | 4/2009 | Cooper | ................ | G06F 17/275 704/9 |
| 2009/0228439 A1 * | 9/2009 | Manolescu | ....... | G06F 17/30864 |

(Continued)

*Primary Examiner* — Mariela Reyes
*Assistant Examiner* — Edward Jacobs
(74) *Attorney, Agent, or Firm* — Schmeiser, Olsen & Watts; Isaac J. Gooshaw

(57) ABSTRACT

A method and system for improving a search query process is provided. The method includes analyzing via a natural language classifier (NLC) circuit of a hardware device, a partial search phase entered in a search field of a graphical user interface with respect to a search query for specified subject matter. A subject based intent classification associated with the search query is determined and compared to intent based data of an intent data repository. In response, an autocomplete phrase associated with the subject based intent classification and the partial search phrase is generated and presented to a user via the graphical user interface.

17 Claims, 4 Drawing Sheets

(56) References Cited

U.S. PATENT DOCUMENTS

| | | | |
|---|---|---|---|
| 2010/0262603 A1* | 10/2010 | Odom | G06F 17/30616 707/728 |
| 2011/0004588 A1* | 1/2011 | Leitersdorf | G06F 17/30864 707/711 |
| 2011/0093488 A1* | 4/2011 | Amacker | G06F 17/30873 707/767 |
| 2011/0320440 A1* | 12/2011 | McDonald | G06F 17/3089 707/723 |
| 2012/0131033 A1* | 5/2012 | Bierner | G06F 17/3064 707/767 |
| 2012/0179710 A1* | 7/2012 | Hanai | G06F 17/30401 707/769 |
| 2012/0301864 A1* | 11/2012 | Bagchi | G09B 7/02 434/362 |
| 2014/0324812 A1* | 10/2014 | Cooper | G06F 17/275 707/706 |
| 2014/0379615 A1* | 12/2014 | Brigham | G06N 99/005 706/11 |
| 2015/0199754 A1* | 7/2015 | Greystoke | G06Q 30/0619 705/307 |
| 2015/0220774 A1* | 8/2015 | Ebersman | G06K 9/00308 382/118 |
| 2016/0014861 A1 | 1/2016 | Zhu et al. | |
| 2016/0104074 A1* | 4/2016 | Shekhawat | G06F 17/30705 706/12 |
| 2016/0147889 A1* | 5/2016 | Lakshmanan | G06N 99/005 707/731 |
| 2016/0364420 A1* | 12/2016 | Cronin | G06F 17/30539 |
| 2017/0024392 A1* | 1/2017 | Shah | G06F 17/3053 |

\* cited by examiner

SEARCH QUERY INTENT

FIELD

The present invention relates generally to a method implementing a search query and in particular to a method and associated system for improving computer search query technology by determining intent associated with a search query.

BACKGROUND

Accurately predicting search parameters based on partial input from a user typically includes an inaccurate process with little flexibility. Analyzing current search parameters with respect past search parameters may include a complicated process that may be time consuming and require a large amount of resources. Accordingly, there exists a need in the art to overcome at least some of the deficiencies and limitations described herein above.

SUMMARY

A first aspect of the invention provides a search query improvement method comprising: analyzing, by a processor enabling a natural language classifier (NLC) circuit, a partial search phase entered in a search field of a graphical user interface (GUI) with respect to a search query for specified subject matter; determining, by the processor executing the NLC circuit with respect to results of the analyzing, a subject based intent classification associated with the search query; comparing, by the processor, the subject based intent classification to intent based data of an intent data repository; automatically generating, by the processor based on results of the comparing, an autocomplete phrase associated with the subject based intent classification and the partial search phrase; and presenting, by the processor to a user via the GUI, the autocomplete phrase.

A second aspect of the invention provides a computer program product, comprising a computer readable hardware storage device storing a computer readable program code, the computer readable program code comprising an algorithm that when executed by a processor of a hardware device implements a search query improvement method, the method comprising: analyzing, by the processor enabling a natural language classifier (NLC) circuit of the hardware device, a partial search phase entered in a search field of a graphical user interface (GUI) with respect to a search query for specified subject matter; determining, by the processor executing the NLC circuit with respect to results of the analyzing, a subject based intent classification associated with the search query; comparing, by the processor, the subject based intent classification to intent based data of an intent data repository; automatically generating, by the processor based on results of the comparing, an autocomplete phrase associated with the subject based intent classification and the partial search phrase; and presenting, by the processor to a user via the GUI, the autocomplete phrase.

A third aspect of the invention provides a hardware device comprising a processor coupled to a computer-readable memory unit, the memory unit comprising instructions that when executed by the processor executes a search query improvement method comprising: analyzing, by the processor enabling a natural language classifier (NLC) circuit of the hardware device, a partial search phase entered in a search field of a graphical user interface (GUI) with respect to a search query for specified subject matter; determining, by the processor executing the NLC circuit with respect to results of the analyzing, a subject based intent classification associated with the search query; comparing, by the processor, the subject based intent classification to intent based data of an intent data repository; automatically generating, by the processor based on results of the comparing, an autocomplete phrase associated with the subject based intent classification and the partial search phrase; and presenting, by the processor to a user via the GUI, the autocomplete phrase.

The present invention advantageously provides a simple method and associated system capable of predicting search parameters based on partial input from a user.

DETAILED DESCRIPTION

Figure 1:
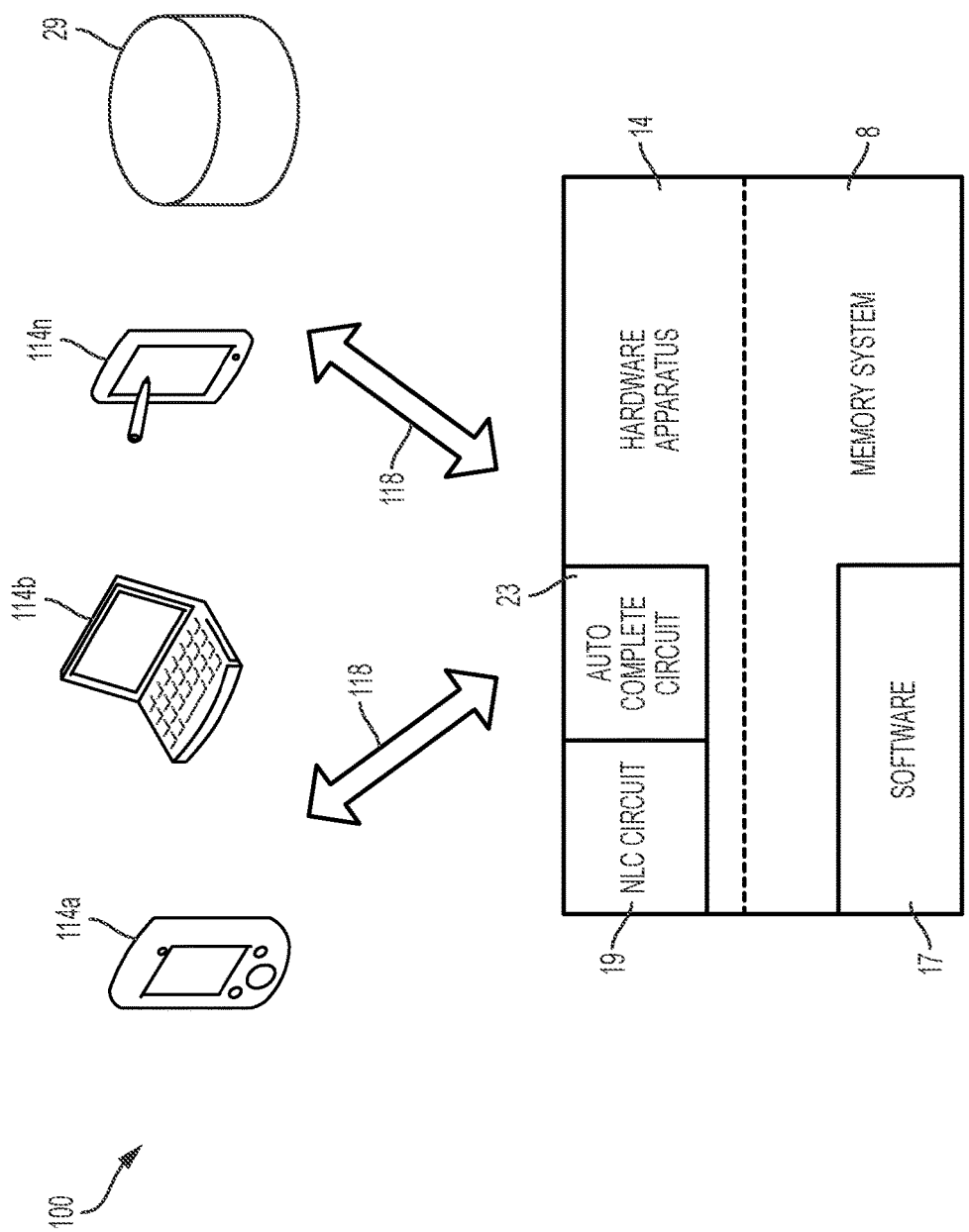
FIG. 1 illustrates a system for improving computer search query technology by determining intent associated with a search query, in accordance with embodiments of the present invention.

FIG. 1 illustrates a system 100 for improving computer search query technology by determining intent associated with a search query, in accordance with embodiments of the present invention. System 100 enables a process for autocompleting words and/or search queries by identifying a type of intent associated with a user search query. Intent is defined herein as an aim or purpose with respect to a subject associated with a user search query. The auto complete process is executed by analyzing indicators associated with an intent of a search query and predicting a complete word or phrase/result for the search query before a query phrase is fully entered (by a user) into a search field of a graphical user interface (GUI). The analysis includes enabling a natural language classifier (NLC) circuit 19 to analyze a user partial user query input and cognitively matching all possible detected patterns associated with the user query input with data from an autocomplete result repository (e.g., intent data repository 29) to identify the intent of the user query. NLC circuit 19 applies deep learning techniques for predicting "best" predefined classes or categories associated with short input sentences or phrases. The classes or categories may trigger a corresponding action with respect to an application such as, inter alia, directing a request to a location or person, answering a question, etc. After the deep learning techniques have completed execution, NLC circuit 19 returns information associated with unknown text and a response may include the name for top classes and confidence values.

System 100 of FIG. 1 includes hardware devices 114a . . . 114n and an intent data repository 29 in communication with a hardware apparatus 14 via a network 118. Hardware devices 114a . . . 114n and hardware apparatus 14 each may comprise an embedded computer. An embedded computer is defined herein as a remotely portable dedicated computer comprising a combination of computer hardware and software (fixed in capability or programmable) specifically designed for executing a specialized function. Programmable embedded computers may comprise specialized programming interfaces. Additionally, hardware devices 114a . . . 114n and hardware apparatus 14 may each comprise a specialized hardware device comprising specialized (non-generic) hardware and circuitry (i.e., specialized discrete non-generic analog, digital, and logic based circuitry) for executing a process described with respect to FIGS. 1-3. The specialized discrete non-generic analog, digital, and logic based circuitry may include proprietary specially designed components (e.g., a specialized integrated circuit such as a natural language classifier (NLC) circuit 19 and auto complete circuit 23 (as described, infra) designed for only implementing an automated process for determining an intent associated with a search query). Hardware apparatus 14 includes a memory system 8, software 17, NLC circuit 19, and an auto complete circuit 23. The memory system 8 (e.g., a database) and intent data repository 29 may each include a single memory system. Alternatively, the memory system 8 and intent data repository 29 may each include a plurality of memory systems. Hardware devices 114a . . . 114n may comprise any type of hardware devices (comprising embedded circuitry for only performing an automated process for determining an intent associated with a search query) including, inter alia, a smart phone, a PDA, a tablet computer, a laptop computer, etc.

System 100 of FIG. 1 enables a process for determining intent associated with a search query as follows:

During a process for enabling a natural language search (initiated by a user) at a Website, an application programming interface (API) for deriving an intent of the user (e.g., via natural language classifiers (NLC)) is applied with respect to a partially completed natural language search phrase entered in a search application GUI. For example, the intent may be determined with respect to the partially completed natural language search phrase being directed toward products, support, or content classifications, as defined within a ground truth (i.e., information provided by direct observation) for the Website. If an intent is not determined via the natural language search, a standard set of relevant options (i.e., with respect to past searches) retrieved from an autocomplete result repository may be returned via an autocomplete result generator circuit. If an intent is determined via the natural language search, a tailored auto completion result is generated by the autocomplete result generator circuit 23 based on an intent classification(s) and a standard set of results from the autocomplete result repository comprising results from previous search queries. The tailored auto completion result is subsequently presented to the user via an autocomplete selection mechanism (e.g., a specialized circuit and GUI). For example, if a user wishes to locate help with respect to repairing a bicycle tire and begins to type the phrase "How do I fix a bike", a natural language classification process is continuously executed with respect to the partial search query resulting in an intent of "support" being determined to be closely correlated within a ground truth for the Website. The intent of "support" is determined because the natural language classifier's cognitive matching capabilities resulted in completed matches (with respect to a high confidence value) with respect to all possible detected patterns in the natural language search query. Examples of the detected patterns may include, inter alia, the following phrases: "how do I", "I fix", "a bike", etc. such that all lend of the aforementioned detected patterns provide evidence with respect to the detected intent of "support". Furthermore, many additional intent phrases such as "cycling" or "consumables" could have been detected based on the detected patterns. A standard set of results may be generated by the auto complete circuit 23 if no viable intent(s) is detected via execution of the natural language search query thereby yielding a standard set of auto complete results. As more intent phrases are inferred from the partial query, the auto complete circuit 23 receives additional context associated with a subset of results more relevant to the user. Therefore, the auto complete circuit 23 refines the results (with respect to intent) based on the specific intent(s) of the user thereby yielding a tailored list of auto-completion results for the partially entered search query provided to the user. For example (in this instance), a selection entitled "How do I patch a bicycle tire?" enables system 100 to respond with alternative word or phrases (differing from originally entered text) such that an actual intent phrase is determined.

Figure 2:
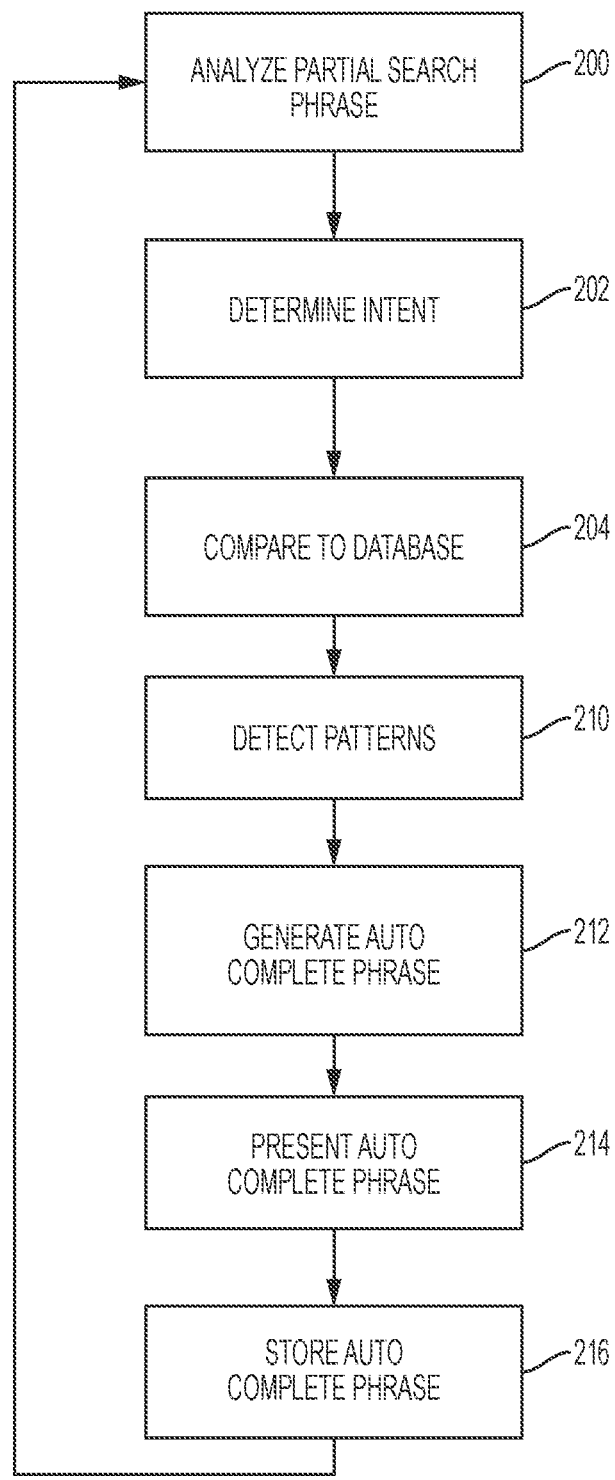
FIG. 2 illustrates an algorithm detailing a process flow enabled by the system of FIG. 1 for improving computer search query technology by determining intent associated with a search query, in accordance with embodiments of the present invention.

FIG. 2 illustrates an algorithm detailing a process flow enabled by system 100 of FIG. 1 for improving computer search query technology by determining intent associated with a search query, in accordance with embodiments of the present invention. Each of the steps in the algorithm of FIG. 2 may be enabled and executed in any order by a computer processor(s) or any type of specialized hardware executing specialized computer code. In step 200, a partial search phase entered in a search field of a GUI (with respect to a search query (associated with a specified Website) for specified subject matter) is analyzed by a NLC circuit. In step 202, a subject based intent classification associated with the search query is determined based on the analysis of step 200. In step 204, the subject based intent classification is compared to intent based data of an intent data repository. In step 210, all possible patterns associated with the partial search phase are detected. In step 212, an autocomplete phrase associated with the subject based intent classification and the partial search phrase is automatically generating based on results of steps 204 and 210. In step 214, the autocomplete phrase is presented to a user via the GUI. Additionally, a confidence percentage value may be presented with the autocomplete phrase. The confidence percentage value is associated with a confidence factor with respect to the intent classification. In step 216, the autocomplete phrase is stored within the intent data repository for future use.

Figure 3A:
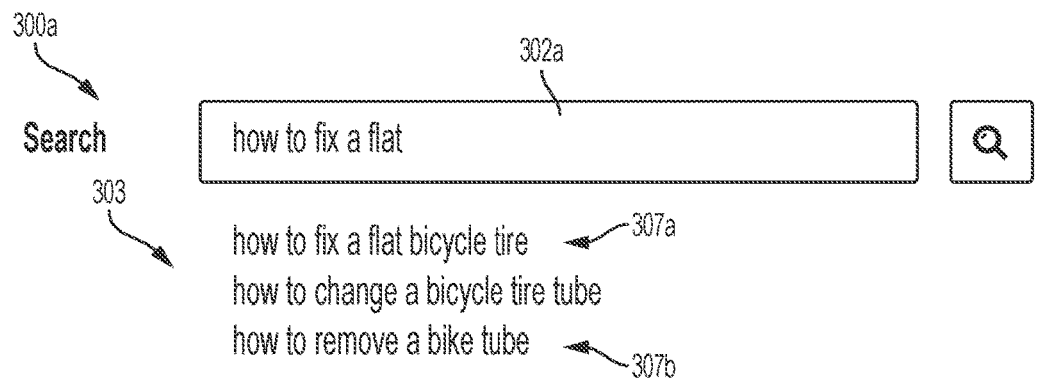
FIG. 3A illustrates a screen shot of a user interface enabled by the system of FIG. 1 for improving computer search query technology by determining intent associated with a search query, in accordance with embodiments of the present invention.

FIG. 3A illustrates a screen shot of a user interface 300a enabled by system 100 of FIG. 1 for improving computer search query technology by determining intent associated with a search query, in accordance with embodiments of the present invention. Additionally, user interface 300a enables a process for presenting autocomplete phrases associated with a partial search query. The autocomplete phrases illustrate a similar intent with respect to the partial search query without the need for exact word suggestions. User interface 300a comprises an input field 302a comprising an inputted search query for the phrase "how to fix a flat". In response, system 100 presents results comprising intent based phrases 307 comprising: a phrase 307a that includes all of the inputted search query phrase with the addition of the phrase "bicycle tire" and a phrase 307b that includes some of the inputted search query phrase "how to" with the addition of the phrase "remove a bike tube".

Figure 3B:
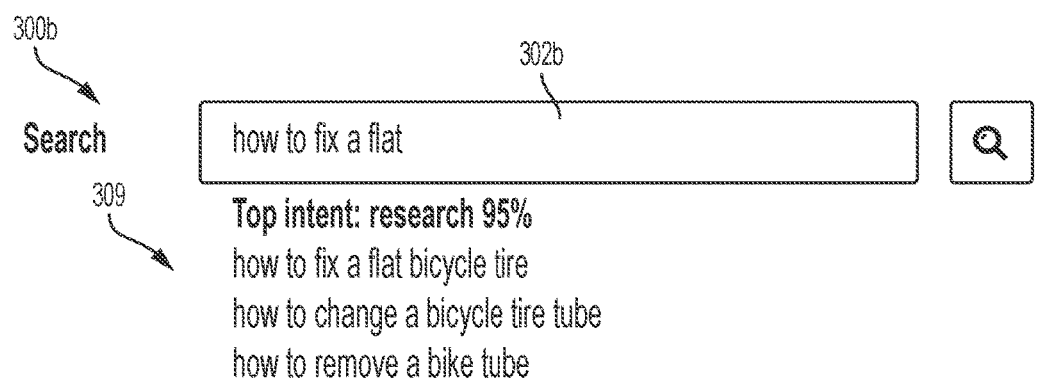
FIG. 3B illustrates a screen shot of a user interface enabled by the system of FIG. 1 for presenting an intent based confidence score, in accordance with embodiments of the present invention.

FIG. 3B illustrates a screen shot of a user interface 300b enabled by system 100 of FIG. 1 for improving computer search query technology by determining intent associated with a search query, in accordance with embodiments of the present invention. User interface 300b comprises an input field 302a comprising an inputted search query for the phrase "how to fix a flat". In response, system 100 presents results comprising intent based phrases 309 with an associated intent based confidence score of 95%.

Figure 4:
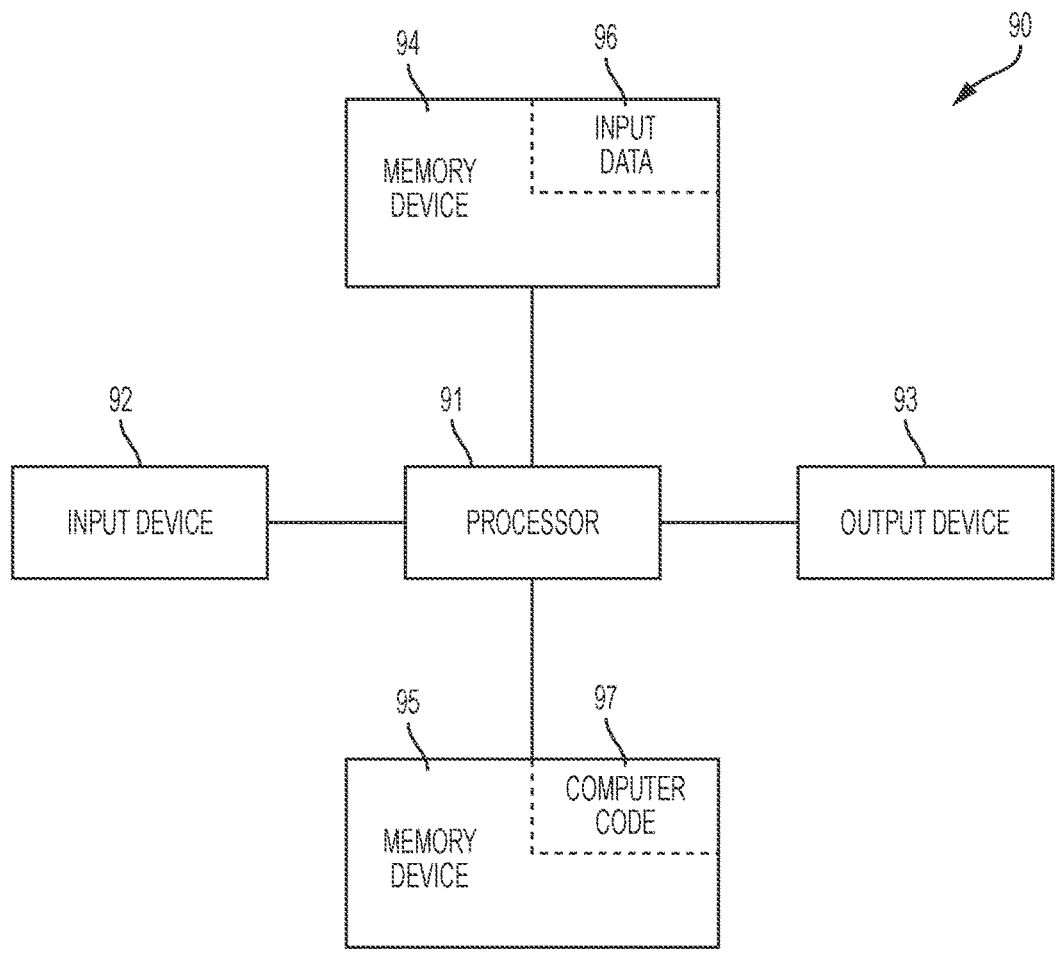
FIG. 4 illustrates a computer system used by the system of FIG. 1 for enabling a process for improving computer search query technology by determining intent associated with a search query, in accordance with embodiments of the present invention.

FIG. 4 illustrates a computer system 90 (e.g., hardware devices 114a . . . 114n and hardware apparatus 14) used by or comprised by the system of FIG. 1 for improving computer search query technology by determining intent associated with a search query, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 4 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for enabling a process for improving computer search query technology by determining intent associated with a search query. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as read only memory device 96) may include algorithms (e.g., the algorithm of FIG. 2) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including the algorithm of FIG. 2) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to enable a process for improving computer search query technology by determining intent associated with a search query. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving computer search query technology by determining intent associated with a search query. In another embodiment, the invention provides a business method that performs the process steps of the invention on a subscription, advertising, and/or fee basis. That is, a service supplier, such as a Solution Integrator, could offer to enable a process for improving computer search query technology by determining intent associated with a search query. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A Website search query improvement method comprising:
analyzing, by a processor enabling a natural language classifier (NLC) circuit of an embedded hardware device, a partial search phrase entered in a search field of a graphical user interface (GUI) with respect to a search query for specified subject matter;
continuously detecting, by the NLC circuit via execution of an automated natural language search query, all possible patterns of the partial search phrase;
matching, by the NLC circuit, all of the detected possible patterns with respect to information within an autocomplete result repository database;
executing, by the NLC circuit, a deep learning process for automated prediction of classes and categories for the partial search phrase;
triggering, by the NLC circuit, an action with respect to software application execution;
determining via application of an application programming interface (API), by the processor executing the NLC circuit with respect to results of the analyzing, a subject based intent classification associated with the search query for content classifications defined within a ground truth for the Website;
determining, by the NLC circuit, that said subject based intent classification comprises a confidence factor of less than 100 percent confidence with respect to the subject based intent classification being correct;

comparing, by the processor, the subject based intent classification to intent based data of an intent data repository;
generating, by said processor based on results of said determining that said subject based intent classification comprises a confidence factor of less than 100 percent confidence and said comparing, a subset of search results of search results data, wherein said subset of search results correlates to said subject based intent classification;
automatically generating, by the processor based on results of the comparing, the matching, the executing, the triggering, the generating, and the detecting, an autocomplete phrase associated with the subject based intent classification and the partial search phrase;
presenting, by said processor to a user via an autocomplete selection mechanism comprising a specialized circuit and the GUI, the autocomplete phrase in combination with additional autocomplete phrases and a single percentage value of said confidence factor, wherein said single percentage value comprises a single composite value indicating a top intent subject classification value associated with said autocomplete phrase in combination with additional autocomplete phrases, and wherein said single percentage value of said confidence factor is presented in a specified arrangement, via said GUI, adjacent to and in between said partial search phrase entered in said search field and said autocomplete phrase in combination with additional autocomplete phrases;
executing, by said processor, an improved Web based search with respect to said autocomplete phrase;
directing, by said processor based on results of said executing, a Web application to a specified Web location associated with said autocomplete phrase and said Website;
presenting, by said processor based on results of said directing, classes of information associated with said autocomplete phrase, wherein said classes of information are configured to enable said triggering;
receiving, by said processor, additional context associated with an additional subset of results determined to be more relevant to said user; and
refining, by said processor executing an auto complete circuit of said embedded hardware device, said additional subset of results based on a specific determined intent of the user thereby yielding a tailored list of auto-completion results for said partial search phrase.

2. The method of claim 1, wherein the intent based data comprises data retrieved during previous search queries associated with the subject based intent classification.

3. The method of claim 1, further comprising:
transmitting, by the processor to the intent data repository, said autocomplete phrase, wherein the autocomplete phrase is stored in the intent data repository.

4. The method of claim 1, wherein the query is associated with a specified Website network.

5. The method of claim 1, wherein the presenting the autocomplete phrase comprises presenting a confidence percentage value with the autocomplete phrase, and wherein the confidence percentage value is associated with a confidence factor with respect to the intent classification.

6. The method of claim 1, wherein the autocomplete phrase comprises a portion of the partial search phrase.

7. The method of claim 1, further comprising:
providing at least one support service for at least one of creating, integrating, hosting, maintaining, and deploying computer-readable code in the hardware device, the code being executed by the computer processor to implement: the determining, the comparing, the automatically generating, and the presenting.

8. A computer program product, comprising a computer readable hardware storage device storing a computer readable program code, said computer readable program code comprising an algorithm that when executed by a processor of a hardware device implements a Website search query improvement method, the method comprising:
analyzing, by the processor enabling a natural language classifier (NLC) circuit of an embedded hardware device, a partial search phrase entered in a search field of a graphical user interface (GUI) with respect to a search query for specified subject matter;
continuously detecting, by the NLC circuit via execution of an automated natural language search query, all possible patterns of the partial search phrase;
matching, by the NLC circuit, all of the detected possible patterns with respect to information within an autocomplete result repository database;
executing, by the NLC circuit, a deep learning process for automated prediction of classes and categories for the partial search phrase;
triggering, by the NLC circuit, an action with respect to software application execution;
determining via application of an application programming interface (API), by the processor executing the NLC circuit with respect to results of the analyzing, a subject based intent classification associated with the search query for content classifications defined within a ground truth for the Website;
determining, by the NLC circuit, that said subject based intent classification comprises a confidence factor of less than 100 percent confidence with respect to the subject based intent classification being correct;
comparing, by the processor, the subject based intent classification to intent based data of an intent data repository;
generating, by said processor based on results of said determining that said subject based intent classification comprises a confidence factor of less than 100 percent confidence and said comparing, a subset of search results of search results data, wherein said subset of search results correlates to said subject based intent classification;
automatically generating, by the processor based on results of the comparing, the matching, the executing, the triggering, the generating, and the detecting, an autocomplete phrase associated with the subject based intent classification and the partial search phrase;
presenting, by said processor to a user via an autocomplete selection mechanism comprising a specialized circuit and the GUI, the autocomplete phrase in combination with additional autocomplete phrases and a single percentage value of said confidence factor, wherein said single percentage value comprises a single composite value indicating a top intent subject classification value associated with said autocomplete phrase in combination with additional autocomplete phrases, and wherein said single percentage value of said confidence factor is presented in a specified arrangement, via said GUI, adjacent to and in between said partial search phrase entered in said search field and said autocomplete phrase in combination with additional autocomplete phrases;

executing, by said processor, an improved Web based search with respect to said autocomplete phrase;

directing, by said processor based on results of said executing, a Web application to a specified Web location associated with said autocomplete phrase and said Website;

presenting, by said processor based on results of said directing, classes of information associated with said autocomplete phrase, wherein said classes of information are configured to enable said triggering;

receiving, by said processor, additional context associated with an additional subset of results determined to be more relevant to said user; and refining, by said processor executing an auto complete circuit of said embedded hardware device, said additional subset of results based on a specific determined intent of the user thereby yielding a tailored list of auto-completion results for said partial search phrase.

9. The computer program product of claim 8, wherein the intent based data comprises data retrieved during previous search queries associated with the subject based intent classification.

10. The computer program product of claim 8, wherein said method further comprises:
transmitting, by the processor to the intent data repository, said autocomplete phrase, wherein the autocomplete phrase is stored in the intent data repository.

11. The computer program product of claim 8, wherein the query is associated with a specified Website network.

12. The computer program product of claim 8, wherein the presenting the autocomplete phrase comprises presenting a confidence percentage value with the autocomplete phrase, and wherein the confidence percentage value is associated with a confidence factor with respect to the intent classification.

13. The computer program product of claim 12, wherein the method further comprises:
presenting, by the processor, additional suggested autocomplete phrases associated with the said confidence percentage value and the autocomplete phrase.

14. A hardware device comprising a processor coupled to a computer-readable memory unit, the memory unit comprising instructions that when executed by the processor executes a Website search query improvement method comprising:
analyzing, by said processor enabling a natural language classifier (NLC) circuit of an embedded hardware device, a partial search phrase entered in a search field of a graphical user interface (GUI) with respect to a search query for specified subject matter;
continuously detecting, by the NLC circuit via execution of an automated natural language search query, all possible patterns of the partial search phrase;
matching, by the NLC circuit, all of the detected possible patterns with respect to information within an autocomplete result repository database;
executing, by the NLC circuit, a deep learning process for automated prediction of classes and categories for the partial search phrase;
triggering, by the NLC circuit, an action with respect to software application execution;
determining via application of an application programming interface (API), by the processor executing the NLC circuit with respect to results of the analyzing, a subject based intent classification associated with the search query for content classifications defined within a ground truth for the Website;
determining, by the NLC circuit, that said subject based intent classification comprises a confidence factor of less than 100 percent confidence with respect to the subject based intent classification being correct;
comparing, by the processor, the subject based intent classification to intent based data of an intent data repository;
generating, by said processor based on results of said determining that said subject based intent classification comprises a confidence factor of less than 100 percent confidence and said comparing, a subset of search results of search results data, wherein said subset of search results correlates to said subject based intent classification;
automatically generating, by the processor based on results of the comparing, the matching, the executing, the triggering, the generating, and the detecting, an autocomplete phrase associated with the subject based intent classification and the partial search phrase;
presenting, by said processor to a user via an autocomplete selection mechanism comprising a specialized circuit and the GUI, the autocomplete phrase in combination with additional autocomplete phrases and a single percentage value of said confidence factor, wherein said single percentage value comprises a single composite value indicating a top intent subject classification value associated with said autocomplete phrase in combination with additional autocomplete phrases, and wherein said single percentage value of said confidence factor is presented in a specified arrangement, via said GUI, adjacent to and in between said partial search phrase entered in said search field and said autocomplete phrase in combination with additional autocomplete phrases;
executing, by said processor, an improved Web based search with respect to said autocomplete phrase;
directing, by said processor based on results of said executing, a Web application to a specified Web location associated with said autocomplete phrase and said Website;
presenting, by said processor based on results of said directing, classes of information associated with said autocomplete phrase, wherein said classes of information are configured to enable said triggering;
receiving, by said processor, additional context associated with an additional subset of results determined to be more relevant to said user; and
refining, by said processor executing an auto complete circuit of said embedded hardware device, said additional subset of results based on a specific determined intent of the user thereby yielding a tailored list of auto-completion results for said partial search phrase.

15. The hardware device of claim 14, wherein the intent based data comprises data retrieved during previous search queries associated with the subject based intent classification.

16. The hardware device of claim 14, wherein said method further comprises:
transmitting, by the processor to the intent data repository, said autocomplete phrase, wherein the autocomplete phrase is stored in the intent data repository.

17. The hardware device of claim 14, wherein the query is associated with a specified Website network.

* * * * *